United States Patent Office 2,752,327
Patented June 26, 1956

2,752,327

RESINOUS PRODUCTS FROM AROMATIC POLY-KETONES AND THIO ACID POLYAMIDES

Herman S. Bloch, Chicago, and Ralph B. Thompson, Hinsdale, Ill., assignors to Universal Oil Products Company, Chicago, Ill., a corporation of Delaware No Drawing. Application April 28, 1952,
Serial No. 284,826

10 Claims. (Cl. 260—65)

This application is a continuation-in-part of our copending application, Serial No. 706,067, filed October 26, 1946, now Patent No. 2,594,537.

The present invention relates to a process for the production of resinous materials useful in many arts as components of coating compositions, as raw materials in the formation of moldable plastic-like objects, and for other uses common to resins of the present type. More particularly, the invention concerns a new class of product characterized as a thermosetting type of resinous material formed by reacting an aromatic polyketone and a particular class of polyamides at conditions resulting in the liberation of water as a by-product of the reaction and the condensation of the reactants to form said resin.

The formation of the present resinous condensation product is ordinarily effected in the absence of any recognized catalytic agent for increasing the speed of reaction or for increasing the yield of resinous products. One object of this invention therefore, is to prepare a thermal setting resinous material by means of a simple condensation reaction between an aromatic polyketone and a thio acid polyamide in the absence of any added catalytic agent, thereby eliminating the necessity of removing or recovering catalytic material from the finished resinous product following the reaction in which the resin is formed.

In one specific application of the present process, an aromatic diketone is condensed with a thio acid polyamide at a reaction temperature resulting in the formation of a hard brittle thermosetting resinous condensation product having a high melting point and a glossy surface.

In a more specific embodiment of the invention, an aromatic diketone is heated with an equimolecular proportion of an aliphatic di-thioamide at a temperature within the range of from about 100° to about 350° C. until about one molecular proportion of water has been eliminated from the reaction mixture per ketone group used, forming as the result of the reaction a thermosetting resinous condensation product.

Other embodiments of the invention relating to specific reactants and to definite means of conducting the reaction, will be treated in the following further description of the invention.

In accordance with the present process, we have discovered that aromatic polyketones, wherein the keto groups are attached either to an aryl nucleus or to a carbon atom in a side chain attached to the aryl nucleus, may be condensed with a thio acid polyamide of either aliphatic, aromatic, naphthenic, or heterocyclic structure to yield a thermosetting resinous condensation product which may vary in hardness from soft pliable masses to hard brittle solids (depending on the extent of reaction) and which normally have clear, transparent properties. Moreover, the polyamide reactant may be selected from the relatively large group of amido compounds comprising the group referred to as the thio acid polyamides, the properties of the resinous product varying in accordance with the particular class of reactant selected.

The reaction mechanism, by means of which the present resinous products are believed to be formed, presumably involves the condensation of one or both of the hydrogen atoms of the amido group with the keto oxygen atoms of the aromatic polyketone reactant forming water and the resinous condensation products herein provided. Under some conditions and in the case of certain amides capable of self condensation to yield the biuret type of linkage, ammonia is liberated during the reaction. This permits the possibility of forming not only the —C=N— linkages by the condensation of a keto group and an amido group, but the thio-biuret type of linkage:

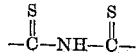

as well (the latter being formed by the condensation of two —NH₂ groups with loss of ammonia as by-product of the reaction) and in addition the

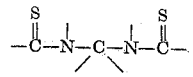

linkage by reaction of a ketone group with two thio-amido groups. In any given resinous product formed by the reaction of an aromatic polyketone and a thio acid polyamide, there may appear one or more monomer condensate units having the structure illustrated in the following formulation:

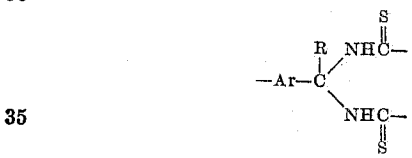

or

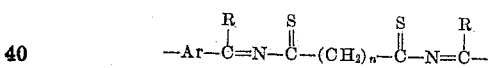

wherein R may represent an alkyl, aryl, alkenyl, or alicyclic radical, Ar represents an aromatic nucleus, hereinafter more fully characterized, and n represents zero or a whole number, depending upon the molecular weight of the thio acid polyamide reactant. Usually, all three types of the above molecular arrangement are present in a given resinous product, the evidence for the formation of the biuret type of linkage being the formation of a small, but nevertheless distinct, quantity of ammonia during the reaction and the evidence for the condensation of one or both of the amido hydrogen atoms with the ketonic oxygen atom being the formation of one molecule of water for each ketone groups entering into the reaction.

The reactant herein referred to as the aromatic polyketone, which when reacted with a thio acid polyamide forms the present resinous condensation product, is defined structurally as a compound containing an aromatic nucleus which is either mononuclear (that is benzenoid) in structure or polynuclear, the former being represented as derived from benzene and the latter being derived from such polynuclear aromatics, for example, diphenyl, napthalene, anthracene, phenanthrene, etc. Polyketones derived from heterocyclic aromatic compounds such as for example quinoline, coumarone, benzothiofuran, carbazole, and the like are also suitable. The aromatic polyketone is further characterized as being substituted on at least one of the nuclear positions of the aryl radical by an acyl group and/or a radical containing one or more keto groups, the total number of ketone groups contained in the aromatic polyketone being at least 2. The indicated aromatic polyketones may be represented by such compounds as o-, m-, p-diacetylbenzene, the various diacetyldiphenyls, o-, m-, or p-acetylbenzophenone, benzil, or benzil-like compounds wherein the keto groups are separated by an intervening alkyl group (as, for example, in dibenzoylmethane) and others of this class containing two or more keto groups or containing other radicals such as alkyl, alkenyl, aryl, amido, amino, halo, nitro, hydroxy, alkoxy, acyloxy, or sulfonic acid groups. Of the indicated utilizable derivatives, the aromatic polyketones containing one or more amide groups, preferably occupying a position in the molecule, at least 5 carbon atoms removed from the ketonic group, thus substantially eliminating cyclization between said groups, are of special note, the latter compounds yielding resinous condensates with the present thio acid polyamide and other aromatic polyketones having distinctive physical properties. The molecular weight and number of keto groups in the aromatic polyketone reactant determines the molecular weight of the resultant resinous condensation product. On the basis of the investigation of the present reaction, it has been deduced that any number of keto groups may be present in the aromatic polyketone, and its molecular weight is limited only by practical considerations such as its melting point which ordinarily must be sufficiently low to melt at the reaction temperature and mix with the other reactants.

The reactant herein specified as a thio polyamide which when condensed with the aromatic polyketone, hereinabove characterized, at condensation reaction conditions forms the resinous product of this invention is selected from the group of amides whose amide radicals contain a thio acid group attached to the organic residue comprising said amide. The organic residue may contain saturated or unsaturated carbon-carbon linkages, may be either of branched, cyclic or straight chain configuration and may contain alkyl, alkenyl, hydroxy, keto, halo, nitro, aryl, etc. substituents attached thereto, the latter groups altering the physical and chemical properties of the ultimate resinous product as compared to the corresponding product obtained from a thio acid polyamide from which such substituents are absent. The organic residue may further be either heterocyclic or homocyclic in structure, represented, for example, by the homocyclic aryl or naphthenyl (cycloalkyl) radicals and the heterocyclic pyridine, pyrrole, etc. rings, as well as cyclic thio acid amide condensation products. Further, the polyamide reactant may be represented by inter-molecular thio acid amide condensation products such as thiobiuret or compounds containing the heretofore characterized biuret-type linkage.

The thio acid amides utilizable herein as one of the primary reactants involved in the present condensation reaction are the carbothionic acid amides (analogous in structure to the carboxamides in which the sulfur atom replaces the oxygen atom of the =CO group). Carbothionic and alkyl, phenyl, or aralkyl carbothionic acids (di-thio acids) may be formed by reacting the Grignard derivative of the appropriate alkyl, phenyl or aralkyl compound with carbon disulfide, hydrolyzing the resulting Grignard reagent and reacting the dithionic acid with ammonia or an alkylamine under dehydrating or amidizing conditions, in accordance with well known procedures of art. The thio acid amides may also contain two or more thioamide groups per molecule, depending upon the physical and chemical properties of the ultimate resinous product desired. Typical representative thio acid polyamides include such compounds as the thio acid analogs of the dicarboxylic acid series, such as thiourea, dicarbothionic acid diamide (corresponding to oxalic acid diamide), methane dicarbothionic acid diamide (corresponding to malonic acid diamide), β-hydroxy-tricarbothionic acid triamide (corresponding to citric acid triamide), etc. of the aliphatic series and thiophthalic acid diamide, m- (or iso-) thio-phthalic acid diamide, p- (or tere-) thiophthalic acid diamide; the various carbothionic acid diamide derivatives of diphenyl, such as o, o', o, m', m, p', etc. dicarbothionic diamides represent typical alternative reactants of the aryl series of thioacid polyamides. The aryl compounds may also contain other nuclear substituents, such as alkyl, alkenyl, nitro, sulfo, halo, amino, and other substituent groups to modify the properties of the resulting resinous condensation products. Further, the compounds may contain alkylene groups between the aryl nucleus and the reactive carbothionic acid amide group. Of the many types and classes of polyamides utilizable as reactants in the present process, it is characteristic of said polyacid amides that the amide nitrogen atom has attached thereto at least one and preferably two hydrogen atoms capable of condensation with the keto group of the aromatic polyketone reactant to form the resinous condensation product herein provided. In the case of polyamide reactants containing other substituent groups, the substituents may be such radicals as alkyl, alkenyl, aryl, aralkyl, or alicyclic groups which may be further substituted with groups such as hydroxy, carboxylic, nitro, hydroxy, etc. Linear polyamide condensation products made by the reaction of a diamine with a dibasic thio acid, or by reaction of an amino acid, a diamine and a dibasic thio acid are also suitable for reaction with a polyketone. Thus, protein material and other naturally occurring amides, as well as synthetic polyamides such as those formed by the condensation of ω-amino-caproic acid or of hexamethylenediamine with adipic acid, either individually or in admixture with a thio acid polyamide, are suitable.

It is a further general requisite of the thio acid polyamide reactant that it melt at a temperature below the condensation reaction temperature hereinafter specified, thereby enabling the reactants to be intimately mixed while in a molten state and permit the respective amido and keto funtional groups thereof to come into intermolecular contact and effect condensation of the reacting components. Alternatively, the reactants may be dissolved in a solvent which mutually dissolves each reactant and permits the requisite intermolecular contact of the amido and keto functional groups.

The condensation reaction involved in the present invention is effected at temperatures of from about 50° to about 350° C., the lower temperature limits of the above range being provided for reactants having low melting points, such as the low molecular weight thio acid polyamides and aromatic polyketones and for those reactants which condense readily at mild temperature conditions. In the case of the less reactive starting materials or of those reactants having a high melting point, the mixture of reactants is desirably heated to temperatures within the upper limits of the above temperature range to effect condensation at a reasonably rapid rate. In some instances, especially in case one of the above classes of starting materials melts at a high temperature, it will be preferable to employ a low molecular weight compound for the other class of starting material. Thus, the low molecular weight reactant while in molten state dissolves the reactant melting at a high temperature and enables the establishment of contact between the reactant functional groups, thereby enhancing the completion of the reaction. Usually, it is not necessary to employ superatmospheric pressures in carrying out the reaction except in the case of utilizing a low boiling reactant, when it becomes desirable to maintain the latter material in substantially liquid phase during the reaction.

The proportion of reactants employed in the condensation will vary according to the type and number of thio acid amide groups and keto groups in each of the respective reactants. In the case of the thio acid polyamides in which the amido groups are not substituted by non-condensable groups (that is, groups other than hydrogen, such as alkyl or aryl), an equimolecular proportion of the aromatic polyketone will theoretically react with a given proportion of a thio acid polyamide reactant in which the number of amide groups per molecule is the same as the number of keto groups in the aromatic polyketone. In the case of the thio acid polyamide reactants in which all of the amido nitrogen atoms are mono-substituted by a non-condensable group, such as an alkyl radical, the corresponding theoretical ratio of reactants is two molecular proportions of polyamide to each molecular proportion of aromatic polyketone when the number of amide groups per molecule of the former is the same as the number of ketone groups per molecule of the latter. Expressed in another manner, it may be said that a ketone group is mono-functional with respect to an amido group

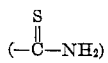

and bifunctional with respect to an alkyl-substituted amido group

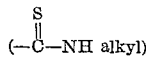

and the proportions of reactants are so adjusted that there are at least equifunctional amounts of ketone and thio acid polyamide, preferably up to about two reactive equivalents of said keto groups to said amido groups. In cases wherein a linear polyamide condensation product is caused to react with a ketone, however, even smaller amounts (as low as 1 to 10% or even less) of the ketonic material may be sufficient to convert the thermoplastic polyamide to a higher melting or even a thermosetting derivative, by the establishment of cross-linkages between the linear condensation chains.

It is within the scope of the present invention to effect the condensation reaction in the presence of a solvent which is miscible with the reactive starting materials and/or the resinous product. The solvent, when utilized, may be selected from the low molecular weight hydrocarbons such as hexane, benzene, petroleum ether, etc., an ether, such as dipropyl ether, dibutyl ether, etc. Preferably, a solvent is selected which boils at a temperature above the reaction temperature required for the condensation reaction, although in some instances, the solvent may be present in the reaction mixture for the express purpose of providing a refluxing medium which maintains the temperature of reaction at a constant value, the boiling point of the solvent. The solvent may also be expressly incorporated into the reaction mixture to form an azeotrope with the water liberated during the condensation reaction, thus providing a means for removing the latter from the reaction products, either during the condensation reaction or following the formation of the product. In many cases it is desirable to employ the solvent as diluent of the reactants so as to control the rate of reaction or the temperaure developed in the reaction mixture. When such precautions are taken, the product usually has a more desirable color and its other physical properties, such as texture and hardness are improved.

After completion of the initial condensation reaction and the separation of the product thereof from the reaction mixture, the resin may be dried and pulverized into a finely divided condition suitable for subsequent molding operations, mixing into protective or covering compositions or for utilization in the manufacture of other compositions, such as plastics. In case an excess of either reactant is employed in the condensation reaction, or if the initial stage of the reaction is not allowed to proceed to complete condensation of the components, the reaction product separated from the initial stage of the condensation may be further reacted with additional quantities of either of the reactants to form thereby a product having properties differing from the initial or partial condensation product. Alternatively, the excess of reactant may be removed from the product by extraction with a suitable solvent, for example, one which is miscible with either the excess reactant or with the resinous product to effect thereby a separation of these components from the partial condensation product. The final stage of the reaction, or completion of the condensation of the reactants present in the partially condensed product may be conducted in a heated mold or other shaping apparatus when desired. It has been found that a convenient means for forming molded articles is to conduct the initial reaction to a stage of partial completion, forming thereby a soft resinous product which usually possesses thermo-plastic properties, and subsequently completing the reaction by heating the initial reaction product in the desired mold, thus forming the thermosetting resinous products of this invention which melts at a high temperature and, in general, is tougher, more brittle and has a greater gloss than the initial or partial condensation product.

Resinous products obtained in the present process have widespread utility in various arts, depending in large measure upon the physical properties of the product. The resins, for example, may be composited with various drying oils such as the glyceride type or unsaturated hydrocarbon type to form varnish and/or paint compositions, and when employed for said purposes, the resins contribute valuable film-forming and bodying properties to such compositions. The protective coatings prepared from the present resins form a glossy surface resistant to chemicals, water and abrasive agents and such compositions in which solid resins of this invention are incorporated dry to hard non-tacky films. In some cases, the products of this invention are useful as plasticizers, especially when the product is a semi-solid or viscous liquid resin. When solid resinous products are obtained, these may be melted or extruded into variously shaped articles or used to impregnate cellulosic materials such as paper or shaped wooden articles, or the resin may be heated with wood flour, wood chips, cotton linters, asbestos or other fiberous materials to form semi-rigid or rigid structural shapes.

The following examples are presented for purposes of illustrating the present invention, but not for the purpose of limiting the scope of the invention in accordance with the particular variables specified in said examples.

*Example I*

Equimolecular proportions of p-diacetylbenzene and thiourea were mixed and heated slowly in an oil bath. Upon melting, the reactants underwent a partial condensation, accompanied by a slight darkening. Heating to 180° C. caused the formation of a fusible resin. When the fusible resin was further heated to a temperature of 190–195° C., additional reaction took place, the resin became darker and the product was an infusible resin.

*Example II*

A dark, infusible resinous product may be formed by heating a mixture of p-diacetylbenzene and thiomalonic acid diamide (methane dicarbothionic amide) in equimolecular proportions at a temperature of 190° C. The resulting resin is insoluble in water and most organic solvents.

We claim as our invention:

1. A process for the production of a resinous material which comprises reacting resinifying reactants consisting essentially of an aromatic polyketone containing at least two carbonyl groups per molecule and a thio acid polyamide having at least two sulfur-containing thio acid amide groups per molecule at resin-forming reaction conditions, said carbonyl groups being the only amido-reactive substituents in said aromatic polyketone.

2. The process of claim 1 further characterized in that said aromatic polyketone is a polyacylated aromatic compound.

3. The process of claim 2 further characterized in that said aromatic compound is a polyacetylbenzene.

4. The process of claim 1 further characterized in that said aromatic polyketone and said thio acid polyamide are reacted in a molecular proportion sufficient to provide from about 1 to 1 to about 2 to 1 carbonyl groups per thio acid amide group.

5. The process of claim 1 further characterized in that said aromatic polyketone and said thio acid polyamide are reacted at a temperature of from about 50° to about 350° C.

6. The process of claim 1 further characterized in that said thio acid polyamide contains not more than one non-condensable hydrocarbon radical per amide nitrogen atom.

7. The process of claim 1 further characterized in that said thio acid polyamide contains one and not more than one alkyl group substituted on each amido nitrogen atom and said aromatic polyketone and thio acid polyamide are reacted in a molecular proportion sufficient to provide at least two thio acid amide groups for each carbonyl group derived from the aromatic polyketone reactant.

8. The process of claim 2 further characterized in that said polyacylated aromatic compound is a diacetylbenzene and said thio acid polyamide is thiourea.

9. The process of claim 1 further characterized in that said aromatic polyketone is diacetylbenzene and said thio acid polyamide is an aliphatic di-carbothionic acid amide.

10. The resinous material resulting from the process of claim 1.

References Cited in the file of this patent

UNITED STATES PATENTS 2,594,537     Block et al. _____ Apr. 29, 1952

FOREIGN PATENTS 253,412     Switzerland _____ Nov. 1, 1948